United States Patent [19]
Pabst

[11] Patent Number: 4,862,703
[45] Date of Patent: Sep. 5, 1989

[54] AIR CONDITIONING APPARATUS

[75] Inventor: Hans-Georg Pabst, Gaimersheim, Fed. Rep. of Germany

[73] Assignee: Udi Ag., Ingolstadt, Fed. Rep. of Germany

[21] Appl. No.: 680,381

[22] Filed: Dec. 11, 1984

[30] Foreign Application Priority Data

Dec. 13, 1983 [DE] Fed. Rep. of Germany ....... 3344998

[51] Int. Cl.$^4$ ............................................... F25B 1/00
[52] U.S. Cl. ..................................... 62/229; 62/323.4
[58] Field of Search .................. 62/229, 133, 323.4, 62/503, 190, 472

[56] References Cited

U.S. PATENT DOCUMENTS

| | | | |
|---|---|---|---|
| 2,775,683 | 12/1950 | Kleist | 62/190 X |
| 3,636,723 | 1/1972 | Kramer | 62/472 X |
| 3,651,657 | 3/1972 | Bottum | 62/503 X |
| 4,488,413 | 12/1984 | Bottum | 62/503 |
| 4,506,519 | 3/1985 | Morse et al. | 62/190 |

Primary Examiner—William E. Wayner
Attorney, Agent, or Firm—Karl Hormann

[57] ABSTRACT

An automotive air conditioning apparatus including means for heating the refrigerant prior to its entry into the compressor during the idle phases thereof when the air conditioner is operating, thereby to lower the specific volume of the refrigerant initially to reduce the degree of filling of the compressor when it is subsequently engaged, for reducing the jolt which would otherwise be noticable at the moment the compressor is engaged.

11 Claims, 1 Drawing Sheet

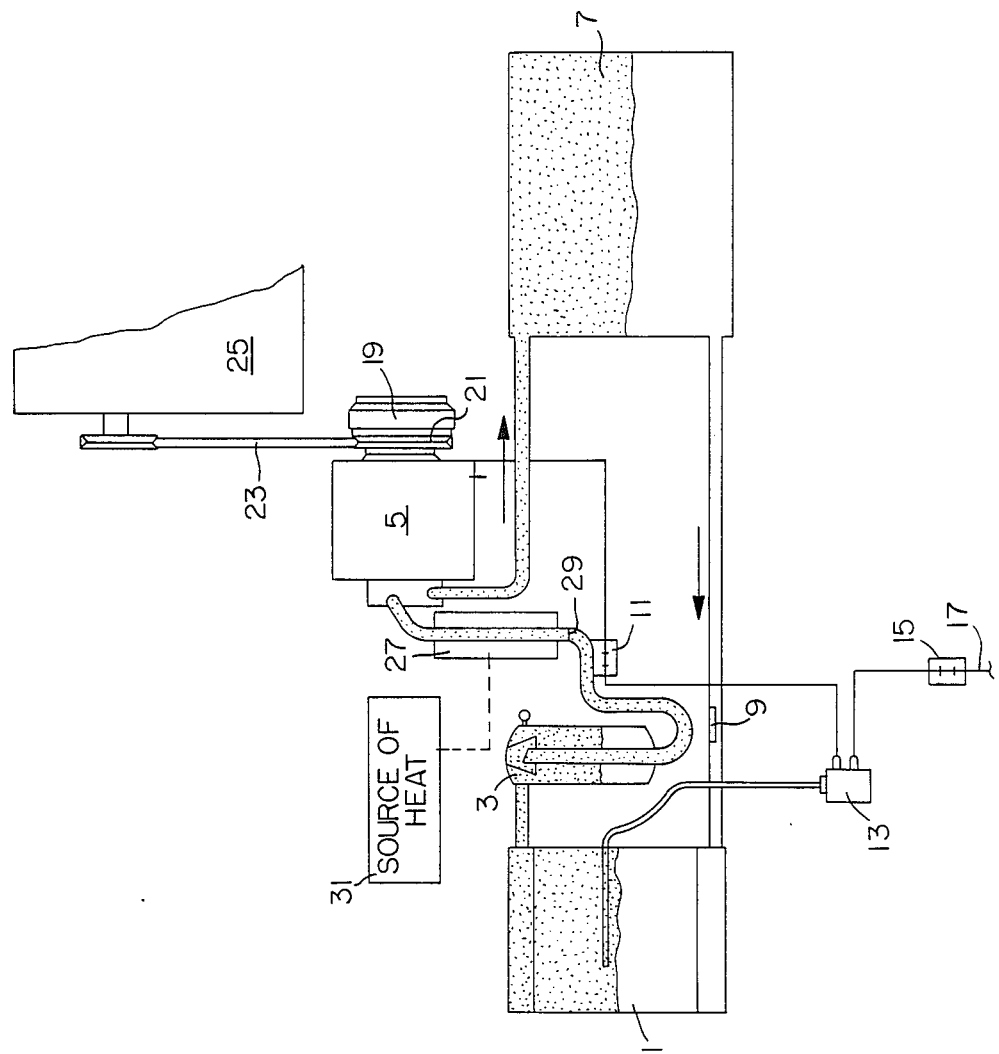

AIR CONDITIONING APPARATUS

BACKGROUND OF THE INVENTION

The invention relates to air conditioning apparatus in general, and in particular to automotive air conditioners of the kind comprising a compressor which upon activating the air conditioner is connectible to a drive mechanism by way of a clutch and which is adapted initially to operate at a reduced capacity.

BRIEF SUMMARY OF THE INVENTION

As is well known, when an automotive air conditioner is activated, i.e. each time its clutch engages to connect the compressor, a noticeable jolt usually occurs, particularly with low powered engines or, more so, with front wheel drives. This jolt results from the sudden deceleration of the engine and the drive train owing to the increased load put upon them by the torque of the compressor.

Attempts have been made to reduce the impact of the jolt by controlling the compressor in such a manner that upon engagement it initially requires reduced power to be driven. Such controls are, however, very complicated, especially if, as is usually the case, the compressor is connectible to the engine by way of an electromagnetic clutch.

It is, therefore, an object of the present invention to provide an automotive air conditioner with simple means for reducing the jolt attendant to the connection of its compressor to an engine.

Another object of the invention resides in providing means for reducing the initial load to which an automotive engine is subjected when the compressor of an air conditioner is engaged.

It is also an object of the invention to provide means for reducing the initial torque of the compressor upon its connection with an automotive engine.

These and other objects of the invention will in part be obvious and will in part appear below.

The invention comprises the apparatus possessing the construction, combination of elements and arrangement of parts which are exemplified in the following disclosure and the scope of which is indicated in the appended claims.

In a preferred embodiment of the invention, the air conditioner of the kind under consideration comprises means for heating the air conditioning refrigerant before its entry into the compressor, at least during the idle phases of the compressor, when the air conditioner is activated.

By heating the refrigerant before its compression, its specific gravity is reduced which in turn leads to a reduced loading or degree of filling and, hence, a reduced effectiveness of the compressor. Because of this, the torque for driving the compressor is reduced, and the initial jolt when connecting the compressor to the engine is reduced as well. Thus, the higher the refrigerant is heated, the less noticable is the jolt when engaging a compressor.

In order to provide a sufficient quantity of heated refrigerant at the moment the compressor is engaged, it is necessary to heat the refrigerant at least during the idle phases of the compressor. The heating may, for instance, be controlled in such a manner that when the sensors of the air conditioner cause disengagement of the compressor, heating commences and when the compressor is again engaged, heating is stopped.

It is of particular advantage continuously to heat a predetermined quantity of the refrigerant by a low level heat transfer in such a manner that when the quantity of heated refrigerant has been depleted after actuating the compressor, only refrigerant which is substantially unheated is supplied. Such a continuous heating at a reduced level avoids the need for special controls, and makes it possible to heat the refrigerant with such simple means as, for instance, an electrical heater, the coolant or the exhaust heat of the engine, or the heat generated by the air conditioner itself. A particular advantage derived from the reduced heat transfer is that when the compressor is idle, the refrigerant is sufficiently heated but that hardly any heating takes place during refrigerant circulation. Therefore, once the supply of heated refrigerant is depleted, the effectiveness of the air conditioner is restored.

BRIEF DESCRIPTION OF THE DRAWING

For a fuller understanding of the nature and objects of the invention, reference may be had to the following detailed description taken in connection with the accompanying drawing which is a schematic representation of an automotive air conditioner incorporating the present invention.

DETAILED DESCRIPTION

The air conditioner of an automotive vehicle schematically depicted in the drawing comprises, as its principal operational elements, a vaporator 1, a unit 3 comprising a accumulator, dryer and fluid separator, a compressor 5, a condensor 7 and an expansion valve 9. For controlling the compressor 5, there are provided a vacuum switch 11, a thermostat 13 and a sensor switch 15 responsive to the ambient temperature. Line 17 is provided to connect the outside temperature sensor switch 15 to a control unit and a source of voltage (not shown). The arrangement of the depicted controls for the compressor is conventional and is therefore believed not to require further description.

The drive shaft of the compressor 5 is provided with an electromagnetic clutch 19 and a pulley 21. The pulley 21 is connected to the drive shaft every time the electromagnetic clutch 19 is engaged to activate the compressor 5. The compressor 5 is driven by a belt 23 running on the pulley 2 and connected to the engine 25 of the vehicle by a similar pulley.

The air conditioner thus far described is conventional, but in accordance with the invention there is provided means for heating, schematically shown as a heat exchanger 27, the refrigerant within suctionline 29 of the cooling system immediately prior to entering the compressor 5. As shown, the refrigerant may be continuously heated at a low level of heat transfer so that it is substantially heated only while not flowing whereas when flowing hardly any heat is transferred to it from the exchanger 27. Thus, the operating cycle of the air conditioner in an intermittent operation of the compressor 5 is as follows.

The compressor 5 discharges the refrigerant into the condensor 7 where heat is dissipated; from there it flows to the expansion valve 9. From the expansion valve 9 it is conducted to the evaporator 1 and, thereafter, it is fed through the heat exchanger 27 back into the compressor 5. While the compressor 5 is running the refrigerant is heated at a very low rate only owing to the reduced transfer of heat to the refrigerant flowing through the line 29 and, hence, the heat exchanger 27. The effectiveness of the compressor 5 thus remains substantially uneffected. However, during idle phases of the compressor 5 with the air conditioner in operation, the refrigerant, now stagnant, in line 29 is heated for as long as the compressor remains idle and the refrigerant is not moving into it. In this manner, the specific gravity of the refrigerant is reduced. As soon as the compressor 5 is again engaged it initially takes up the heated refrigerant of reduced gravity only. This results in the compressor 5 being filled at a lower degree which in turn reduces its effectiveness and initially requires a reduced operating torque which gradually increases, however, as the quantity of heated refrigerant in the tube 29 is fed into the compressor 5 and is replaced by substantially unheated refrigerant. This desirable effect significantly reduces the jolt which would otherwise result at the time the compressor is engaged. Once the supply of heated refrigerant is depleted, the effectiveness of the compressor 5 is restored as it receives practically unheated refrigerant only.

The supply of heat to the heat exchanger 27 has only been schematically depicted by an electric heater 31 whose connection with the heat exchanger 27 has been indicated by a broken line. Another broken line between the vacuum switch 11 and the electric heater 31 is to indicate the possibility of actuating the electric heater when the compressor 31 is running in an idle phase, and vice versa. It will be appreciated by those skilled in the art, heat may be supplied in many different ways. As mentioned above, it would be possible, for instance, to use an electric heater as the source; however, the heat of the engine radiator or of the exhaust system as well as the heat generated by the condensor 7 of the air conditioner itself may be applied to bring about the desired cyclical heating of the refrigerant.

What we claim is:

1. An air conditioning apparatus of the kind driven by an automotive engine, comprising:
    a compressor comprising refrigerant intake means and selectively operable at a predetermined torque for compressing refrigerant;
    means, including clutch means, for selectively switching said compressor between operating phases and idle phases by respectively connecting it to and disconnecting it from the engine;
    means for initially operating said compressor at a torque lower than said predetermined torque upon its connection to said engine, said means for operating said compressor at said lower torque comprising:
    means for heating the refrigerant in said intake means at least during idle phases of the compressor to lower its specific gravity prior to its entry into said compressor, thereby initially reducing the degree of filling of said compressor and providing a transition substantially free of jolts upon said compressor being switched to an operating phase.

2. The apparatus of claim 1, wherein said means for heating said refrigerant comprises means for continuously heating said refrigerant at a low rate of heat transfer, whereby switching said compressor from an idle phase to an operating phase causes said refrigerant heated in said intake means during an idle phase initially to be fed into the compressor followed by substantially unheated refrigerant.

3. The apparatus of claim 1 wherein the heating means comprises an electric heater.

4. The apparatus of claim 1, wherein the heating means comprises a radiator of the engine.

5. The apparatus of claim 1, wherein the heating means comprises the exhaust system of the engine.

6. The apparatus of claim 1, wherein the heating means comprises the condenser of the air conditioning apparatus.

7. The apparatus of claim 1, wherein the clutch is activated by a thermostat.

8. The apparatus of claim 7, wherein the thermostat is connected to a switch responsive to ambient temperature.

9. An air conditioning apparatus for use in automotive vehicles, comprising:
    a compressor operative at a predetermined torque for compressing refrigerant;
    means, including a clutch, for selectively switching the compressor between operating phases and idle phases during operation of the air conditioning apparatus;
    means for initially reducing the predetermined torque of the compressor subsequent to its being switched to an operating phase, said torque reducing means comprising means for heating the refrigerant to lower its specific gravity prior to its entry into the compressor at least during the idle phases thereof during of the operation of the air conditioning apparatus, thereby initially to reduce the degree of filling and the predetermined torque of the compressor upon its being switched to an operating phase; and
    means for operating the heating means when the compressor is in its idle phase and for deactivating the heating means when the compressor is in its operating phase.

10. The apparatus of claim 4 wherein the operating means includes sensors connected to control means of the air conditioning apparatus.

11. An air conditioning apparatus for use in an automotive vehicle, comprising:
    a compressor including refrigerant intake means connected to an evaporation means and refrigerant output means connected to condenser means, said compressor being selectively actuable between idle phases and operative phases of predetermined torque for compressing refrigerant;
    means for selectively actuating said compressor between said idle and said operative phases;
    means for transferring heat to refrigerant in said intake means at least during idle phases of said compressor for reducing the specific gravity of said refrigerant thereby initially operating said compressor at a torque lower than said predetermined torque upon switching said compressor to an operative phase.

* * * * *